US007930094B2

(12) United States Patent
Bauchot et al.

(10) Patent No.: US 7,930,094 B2

(45) Date of Patent: Apr. 19, 2011

(54) SYSTEM AND METHOD FOR EXCHANGING POSITIONING INFORMATION BETWEEN VEHICLES IN ORDER TO ESTIMATE ROAD TRAFFIC

(75) Inventors: Frederic Bauchot, Saint-Jeannet (FR); Jean-Yves Clement, Saint Jeannet (FR); Gerard Marmigere, Drap (FR); Pierre Secondo, Tourrettes sur Loup (FR)

(73) Assignee: International Business Machines Corporation, Armonk, NY (US)

(*) Notice: Subject to any disclaimer, the term of this patent is extended or adjusted under 35 U.S.C. 154(b) by 1028 days.

(21) Appl. No.: 11/739,951

(22) Filed: Apr. 25, 2007

(65) Prior Publication Data

US 2008/0065311 A1 Mar. 13, 2008

(30) Foreign Application Priority Data

Sep. 12, 2006 (EP) .................................... 06300940

(51) Int. Cl.
*G06F 19/00* (2006.01)

(52) U.S. Cl. ...................................................... 701/117

(58) Field of Classification Search .......... 701/117–119, 701/200, 207, 208, 212, 213; 340/988–990, 340/992, 995.1, 995.12, 995.13, 995.17

See application file for complete search history.

(56) References Cited

U.S. PATENT DOCUMENTS

| | | | | |
|---|---|---|---|---|
| 5,428,544 | A | 6/1995 | Shyu | |
| 6,092,020 | A | 7/2000 | Fastenrath et al. | |
| 6,150,961 | A * | 11/2000 | Alewine et al. | 340/995.1 |
| 6,708,107 | B2 | 3/2004 | Impson et al. | |
| 6,862,500 | B2 | 3/2005 | Tzamaloukas | |
| 2006/0031003 | A1 * | 2/2006 | Sun et al. | 701/117 |

FOREIGN PATENT DOCUMENTS

| | | | |
|---|---|---|---|
| CN | 1535553 | A | 10/2004 |
| JP | 2002234411 | A | 8/2002 |
| WO | WO 2004/036815 | A2 | 4/2004 |

* cited by examiner

*Primary Examiner* — Kim T Nguyen

(74) *Attorney, Agent, or Firm* — Ronald A. Kaschak; Hoffman Warnick LLC

(57) ABSTRACT

The present invention discloses a method, system and computer program embarked in a vehicle, for estimating traffic conditions based on positioning information exchanged with other vehicles using wireless communication. A method in accordance with an embodiment of the invention includes: receiving positioning information repeatedly broadcast by at least one vehicle, the positioning information for each vehicle including: information related to a current location of the vehicle; and information identifying the vehicle; calculating based on at least two successive locations of a same identified vehicle, a current speed and a current direction for the vehicle; and estimating current traffic conditions based on current location, speed and direction of identified vehicles.

23 Claims, 4 Drawing Sheets

SYSTEM AND METHOD FOR EXCHANGING POSITIONING INFORMATION BETWEEN VEHICLES IN ORDER TO ESTIMATE ROAD TRAFFIC

FIELD OF THE INVENTION

The present invention relates to automotive systems and more particularly to a method, system and computer program product for sharing positioning information between vehicles using wireless communications and for notifying drivers of abnormal road traffic conditions.

BACKGROUND OF THE INVENTION

The announcement of abnormal road traffic conditions, such as a traffic jam, an accident, or a sudden traffic speed decrease is very important to limit the number of accidents on the road.

On some highways, dedicated systems are in place for detecting some of these conditions, typically traffic jam conditions. These systems rely on different infrastructure means, such as speed sensors, video surveillance equipment, and information boards to announce abnormal traffic conditions. A problem is that such infrastructure means are expensive to deploy and to maintain. Furthermore such infrastructure means cannot react very quickly in response to sudden conditions, and they cannot react accurately to traffic conditions with a limited impact on the road.

Examples of traffic detection systems based on a fixed infrastructure are briefly described below.

U.S. Pat. No. 6,150,961 to Alewine et al., entitled "Automated traffic mapping," discloses a system of mobile units installed in multiple vehicles in traffic. These mobile units include both wireless communications devices and apparatus that determine the location of each vehicle. Monitoring a vehicle's position as a function of time also reveals the velocity of the vehicle. Position and speed information is periodically broadcast by the vehicles to a central monitoring station and to neighboring vehicles. At the central monitoring station, the collective input of a set of vehicles is processed to provide an instant chart of traffic conditions in the area. Warnings of delays or updates on traffic conditions on the road ahead are then automatically returned to subscribers of the information or are used as part of an Intelligent Vehicle Highway System (IVHS). Neighboring vehicles within a region communicating with one another form a network in which the broadcast information is processed locally on the respective vehicles to estimate possible problems ahead and consider computing an alternate road and/or checking with the central monitoring station for more information. If out of range of the central monitoring station, the vehicles in the network form a local area network for the exchange and update of information, and when any vehicle in the network is within range of the central monitoring station, the local area network data is uploaded to help update the overall traffic information.

U.S. Pat. No. 6,862,500 to Tzamaloukas Assimakis, entitled "Methods for communicating between elements in a hierarchical floating car data network," discloses participating vehicles and egress points which communicate with each other according to an infrastructure mode. Participating vehicles communicate with other participating vehicles according to an ad-hoc mode. In an infrastructure mode packet transmitting method for a participating vehicle, beacon service table packets, vehicle service table packets, or packet bursts are created and transmitted. In an infrastructure mode packet receiving method for a participating vehicle, beacon service table packets, vehicle service table packets, packet bursts, or negative acknowledgement packets are received. In an infrastructure mode packet transmitting method for an egress point, an enhanced beacon packet or a negative acknowledgement packet is created and transmitted. In an infrastructure mode packet receiving method for an egress point, beacon service table packets, vehicle service table packets, or packets bursts are received. In an ad-hoc mode packet transmitting method for a participating vehicle, beacon service table packets, vehicle service table packets, packet bursts, or positive acknowledgement packets are created and transmitted. In an ad-hoc mode packet receiving method for a participating vehicle, beacon service table packets, vehicle service table packets, packet bursts, or positive acknowledgement packets are received.

U.S. Pat. No. 6,092,020 to Fastenrath et al., entitled "Method and apparatus for obtaining traffic situation data," discloses a method for obtaining data on the traffic situation in a road network, wherein a plurality of vehicles involved in road traffic ("floating cars") and equipped with sensory analysis equipment for collecting traffic-relevant sensor data, which include at least one variable representing the current speed v(t) of a given vehicle, wirelessly transmit to a center at chronological intervals individual reports concerning the current traffic situation in the vicinity of the given vehicle determined on the basis of collected sensor data by a data processing device arranged in the vehicle. The individual reports, in addition to containing a classifying interpretation of the traffic situation carried out by the data processing device based on the collected speed variables, which interpretation encompasses at least the class of "traffic-related hold-up" (traffic jam), also contain, as part of the report, a confidence factor F, which represents a measure for the waviness of the chronological profile of the speed variables, especially the vehicle speed v(t), for the period of time to which the given individual report relates.

Some of the more recent systems are based on a GSM infrastructure. However, the GSM technology has a limited locating capacity and these systems require the presence of active GSM phones in vehicles. Other systems are based on the exchanged of traffic information between vehicles by means of wireless communications.

U.S. Pat. No. 5,428,544 to Shyu Jia-Ming, entitled "Traffic information inter-vehicle transference and navigation system," discloses a method and an apparatus for the transference of traffic information among vehicles and for assisting navigation of the vehicles. The traffic information of the vehicles, such as the speed and the route and direction, is remotely transmitted to each other during passing, via communication devices mounted on each of the vehicles. The apparatus comprises sensors to detect the direction and the displacement of the vehicle; a microcomputer to recognize the position of the vehicle by referring the detected direction and displacement to a digitized map; a receiver to receive the passing vehicle's traffic information to be processed by the microcomputer; a transmitter to transmit the traffic information to the passing vehicle; and a navigation unit in the microcomputer to generate navigation information and indicate the traffic information of vehicles ahead is transmitted to a receiving vehicle in an indirect manner via a passing International patent application WO04036815, entitled "Enhanced Mobile Communication Device and Transportation Application," discloses an enhanced mobile communication device which communicates directly with other enhanced mobile communication devices in an ad-hoc mode over a wireless medium. The device transmits and receives packets of digital data. Network transmission parameters for transmitting the packets of digital data are dynamically customized according to the sender and receiver positions so as to increase the probability that the packets are received. Packet lengths may be varied. The number of times a packet is transmitted may also be varied according to activity in the wireless medium. Attempts to transmit are made periodically and the period of transmission is adjusted according to activity in the wireless medium. In a transportation application, the packets comprise vehicle traffic congestion update information. The device maintains a traffic database and a map database. Traffic congestion update information is exchanged with other devices. Routes through the map from a source or current position of the device to a destination are computed according to an analysis of the traffic database U.S. Pat. No. 6,708,107 to Impson et al., entitled "Real-Time Ad Hoc Traffic Alert Distribution," discloses a traffic characterization system and method of use for executing a traffic characterization protocol over an ad hoc communications network. Conventional in-vehicle computers and conventional wireless local area network (LAN) transceivers host the traffic characterization system and the messages generated by the system. As a traffic jam occurs, the mobile units send out traffic characterization data in a sequence activated by the content of the messages and traffic characterization protocol of the present invention. All vehicles participating in the traffic characterization system and approaching the traffic jammed area receive the characterization data and have the opportunity to route around the jam.

One of the problems of the systems disclosed in the prior art previously cited is that they are based either on a terrestrial infrastructure or on a specific communication network. These systems generally require a measure and exchange of a huge amount of information and the use of complex algorithms to characterize the traffic.

SUMMARY OF THE INVENTION

One aspect of the present invention is directed to a method for estimating traffic conditions based on positioning information exchanged between vehicles using wireless communication, the method comprising: receiving positioning information repeatedly broadcast by at least one vehicle, the positioning information for each vehicle comprising: information related to a current location of the vehicle; and information identifying the vehicle; calculating based on at least two successive locations of a same identified vehicle, a current speed and a current direction for the vehicle; and estimating current traffic conditions based on current location, speed and direction of identified vehicles.

Another aspect of the invention is directed to a system for use in a vehicle for estimating traffic conditions based on positioning information exchanged between vehicles using wireless communication, comprising: a system for receiving positioning information repeatedly broadcast by at least one vehicle, the positioning information for each vehicle comprising: information related to a current location of the vehicle; and information identifying the vehicle; a system for calculating based on at least two successive locations of a same identified vehicle, a current speed and a current direction for the vehicle; and a system for estimating current traffic conditions based on current location, speed and direction of identified vehicles.

The present invention provides numerous advantages. For example, the present invention does not require any dedicated terrestrial infrastructure, and can therefore be deployed on any type of road (i.e., the present invention is not limited to highways and the like). The present invention is simple to implement and can be implemented in an affordable manner. The present invention can react very quickly to abnormal traffic situations, and can react, even for a situation having a limited impact on the traffic (e.g., a single vehicle blocking the traffic lane can be detected). The present invention does not require stringent computing power and memory capacity for treating information received from other vehicles. The present invention does not require the exchange of a high volume of information with other vehicles and thus does not require sophisticated anti-collision systems. Further, the present invention does not require to exchange complex structures of data.

The foregoing, together with other aspects, features, and advantages of the present invention can be better appreciated with reference to the following specification, claims and drawings.

BRIEF DESCRIPTION OF THE DRAWINGS

These and other features of this invention will be more readily understood from the following detailed description of the various aspects of the invention taken in conjunction with the accompanying drawings.

DETAILED DESCRIPTION OF THE INVENTION

The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown and described but is to be accorded the widest scope consistent with the principles and features described herein.

A short range transmitter embarked in a vehicle (e.g., car, lorry, bus, etc.), broadcasts at regular time intervals (e.g., every 1 or 10 seconds): the geographical position of the vehicle (measured for example using a Global Positioning System (GPS)); and information identifying the vehicle.

The range of the transmitter is, for example, between 1 kilometer to 5 kilometers. The rest of the time the system embarked in the vehicle receives the identification and position of all other similar systems embarked in the vehicles within a radius of, for instance, 1 to 5 Km. Each equipped vehicle is aware of the position of all the other vehicles located at a distance of 0 Km to 5 Km. The embarked system is connected to a navigation and cartographic system preferably including a GPS. In this way, it is easy for the embarked system to calculate the speed of each other equipped vehicle and to locate them on a map by means of the navigation and cartographic system embarked in the vehicle. It is possible to flag by means of a particular color (for instance, in red, yellow or blue), each street/road to give to the driver of the vehicle an indication of the traffic. A navigation system can find alternate routes in order to avoid traffic jams and recommend one or more itineraries based on an estimated average time.

Figure 1:
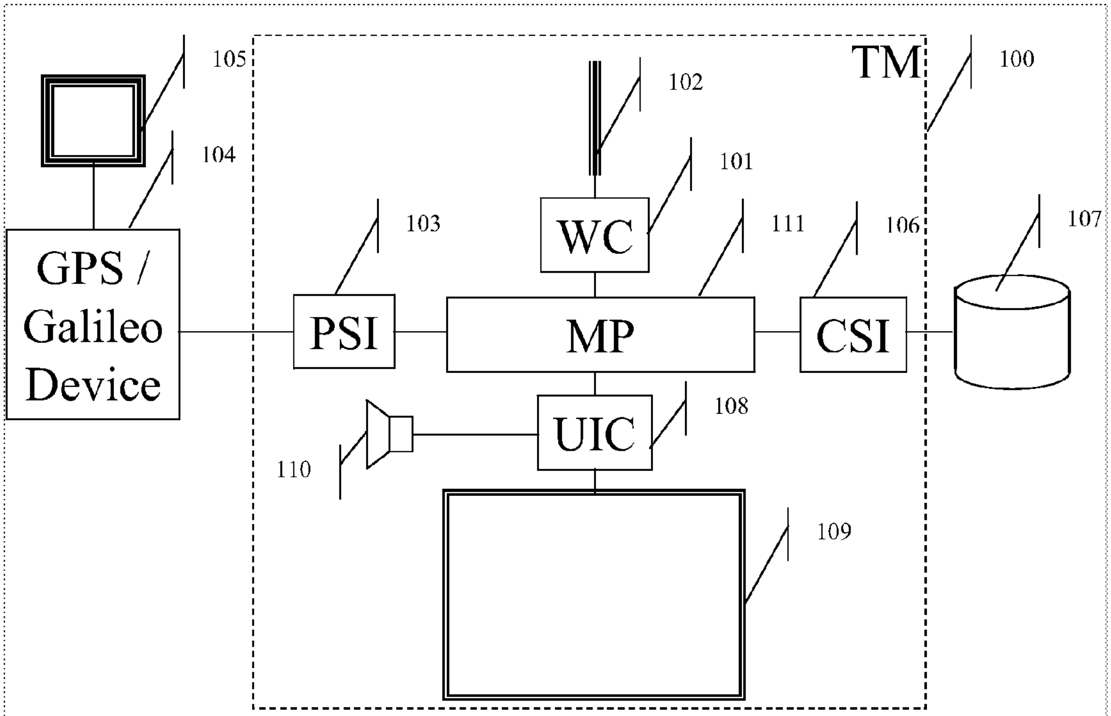
FIG. 1 is a view of an illustrative Traffic Manager according to an embodiment of the present invention.

The present invention is based on an embarked device, known as "Traffic Manager" 100 or "TM" for short, which is depicted in FIG. 1.

Each TM 100 comprises a medium range Wireless Communication system 101 ("WC" for short) for broadcasting information towards other vehicles. The WC 101 is isotropic to cover the vicinity in all directions. In an embodiment of the present invention, the WC 101 operates on the license free frequency band of 446 MHz, which has a typical range of 5 kilometers, and uses a linear antenna 102 of about 8 centimeters. Other frequencies/antennae are also possible.

Each TM 100 comprises a Positioning System Interface 103 ("PSI" for short) to interact with conventional positioning systems 104 such as GPS or Galileo. Such positioning systems 104 conventionally rely on patch antennas 105 to interact with geostationary satellites.

Each TM 100 comprises a Cartography System Interface 106 ("CSI" for short) to interact with optionally present conventional cartographic information repositories 107.

Each TM 100 comprises a User Interface Controller 108 ("UIC" for short) to manage the display of information on a screen 109 or the playing of sounds on a speaker 110. In an embodiment of the present invention, the display 109 is a conventional VGA or equivalent display, which is able at any time to display a map around the current position of the vehicle, thanks to the cartographic information available in the repositories 107 and retrieved through the CSI 106.

Each TM 100 further comprises a Micro-Controller ("MP" for short) 111 interacting with and driving the main components of the TM 100, WC 101, PSI 103, CSI 106, and UIC 108.

Figure 2:
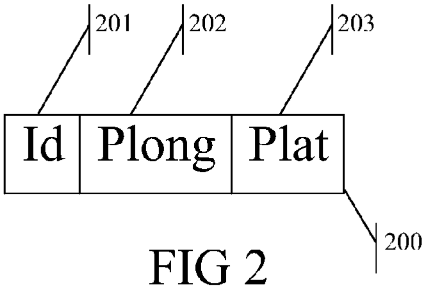
FIG. 2 shows the structure of messages exchanged between vehicles according to an embodiment of the present invention.

With a frequency F1=1/T1 (T1=period of time between the transmission of two messages), each vehicle transmits a short message 200 carrying information structured according to FIG. 2.

A first field 201 called "Id" in the present description, corresponds to an identifier uniquely characterizing the vehicle. In an embodiment of the present invention, a VIN (Vehicle Identification Number) can be used as identifier.

A second field 202 called "Plong" in the present description, corresponds to the Longitude of the vehicle. This information is provided by the positioning system 104 through the PSI 103.

A third field 203 called "Plat" in the present description, corresponds to the Latitude of the vehicle. This information is provided by the positioning system 104 through the PSI 103.

In an alternate embodiment, the message comprises a fourth field comprising the current time when the message is broadcast (or the current time when the position of the vehicle is measured).

In an embodiment of the present invention, to avoid any collision, the broadcast of the message 200 is not repeated exactly every T1 seconds. The time interval between two transmissions is equal to T1 (1+j/J) where j is a random number varying between 0 and 1, and where J is a fixed number. In an embodiment of the present invention, the number J is equal to 10. With this value of J, the variation of the time interval between two transmissions is 10%.

Figure 3:
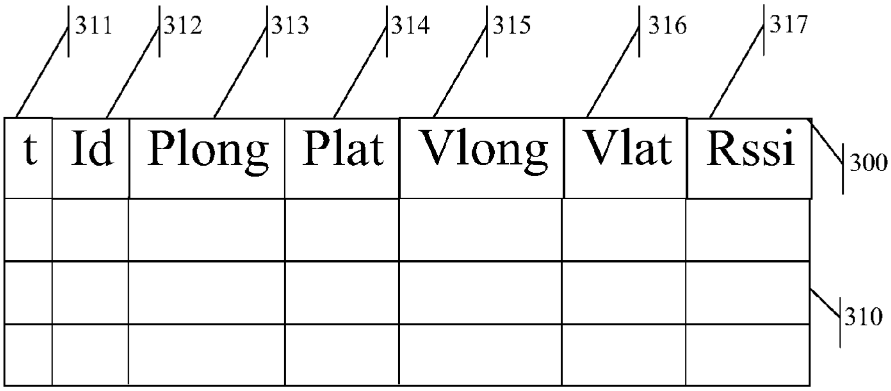
FIG. 3 describes an illustrative Vehicle Position Table according to an embodiment of the present invention.

Each vehicle maintains a Vehicle Position Table 300 (or "VPT" for short) comprising a plurality of records 310. Each record corresponds to a particular vehicle and comprises four fields, as illustrated in FIG. 3.

A first field 311, named "t" in the present description, specifies time information. Each time a new record 310 is created in the VPT 300, the "t" field is set equal to the current time. In an alternate embodiment, it is also possible to set the "t" field equal to the time retrieved from the received message.

A second field 312, named "Id" in the present description, specifies an identifier for the vehicle.

A third field 313, named "Plong" in the present description, comprising information about the Longitude of the vehicle.

A fourth field 314, named "Plat" in the present description, comprises information about the Latitude of the vehicle.

A fifth field 315, named "Vlong" in the present description, comprises computed information about the Longitude Speed of the vehicle.

A sixth field 316, named "Vlat" in the present description, comprises computed information about the Latitude Speed of the vehicle.

A seventh field 317, named "Rssi" in the present description, specifies at which power level the message has been received from the vehicle.

As background activity, each vehicle scans VPT 300 in order to manage the volume of recorded information, to identify records 310 deserving to be removed as being too old, and to report on remaining valid records. This background activity is performed with a frequency equal to F2=1/T2 (T2=the background process is repeated every T2 seconds).

If the number of records 310 within the VPT 300 exceeds a threshold N1, then the responsiveness of the receiver part of the WC is set to a lower value S0 in order to limit the range of the receiver and to decrease the number of reachable vehicles. All the records 310 with a Rssi field 317 below the value S0 are deleted.

If the number of outstanding records 310 within the VPT 300 is below a threshold N2 (with N2<N1), then the responsiveness of the receiver part of the WC 101 is set back to a high value S1 to restore the normal range of the receiver and to increase the number of reachable vehicles.

Information cleaning is then performed by comparing for each record 310, the "t" field 311 with the current time "T" reference. If the difference between "T" and "t" exceeds a predefined threshold, then the corresponding record 310 is considered as being too old and the record is deleted from the VPT 300. Otherwise the record is displayed to the user on the screen 109. The UIC 108 draws an arrow starting at coordinates (Plong, Plat), and ending at coordinates (Plong+Vlong, Plat+Vlat). In an embodiment of the present invention, the brightness of this arrow is inversely proportional to the age of the record, so that fresh information is more visible than older information.

Between the transmission of two successive messages 200, each vehicle is in a listening mode, being ready to receive messages 200 from other vehicles. Each time the vehicle receives a message 200 from another vehicle, a new record 310 is created in the VPT 300. Upon creation of this new record, the "t" field is set equal to the current time (in an alternate embodiment the "t" field is set equal to the time retrieved from the received message), and the fields 312 "Id", 313 "Plong", and 314 "Plat" are filled with the values of fields 201, 202, and 203 of the received message 200.

The VPT 300 is scanned to find another record sharing the same "Id" field 312 (originated from the same vehicle). If such a record is not found, then the method ends at this point, otherwise the method continues.

The new record 310 is updated by filling the fields 315 "Vlong" and 316 "Vlat" with the computed speed, along the longitude and the latitude coordinates, derived from the two successive positions of the vehicle. In an embodiment, if the speed is found below a predefined threshold, then an alert is raised or a sound is emitted on the speaker 110 to alert the user of a potential danger (e.g., traffic jam). The found (old) record is deleted from the VPT 300.

Figure 4:
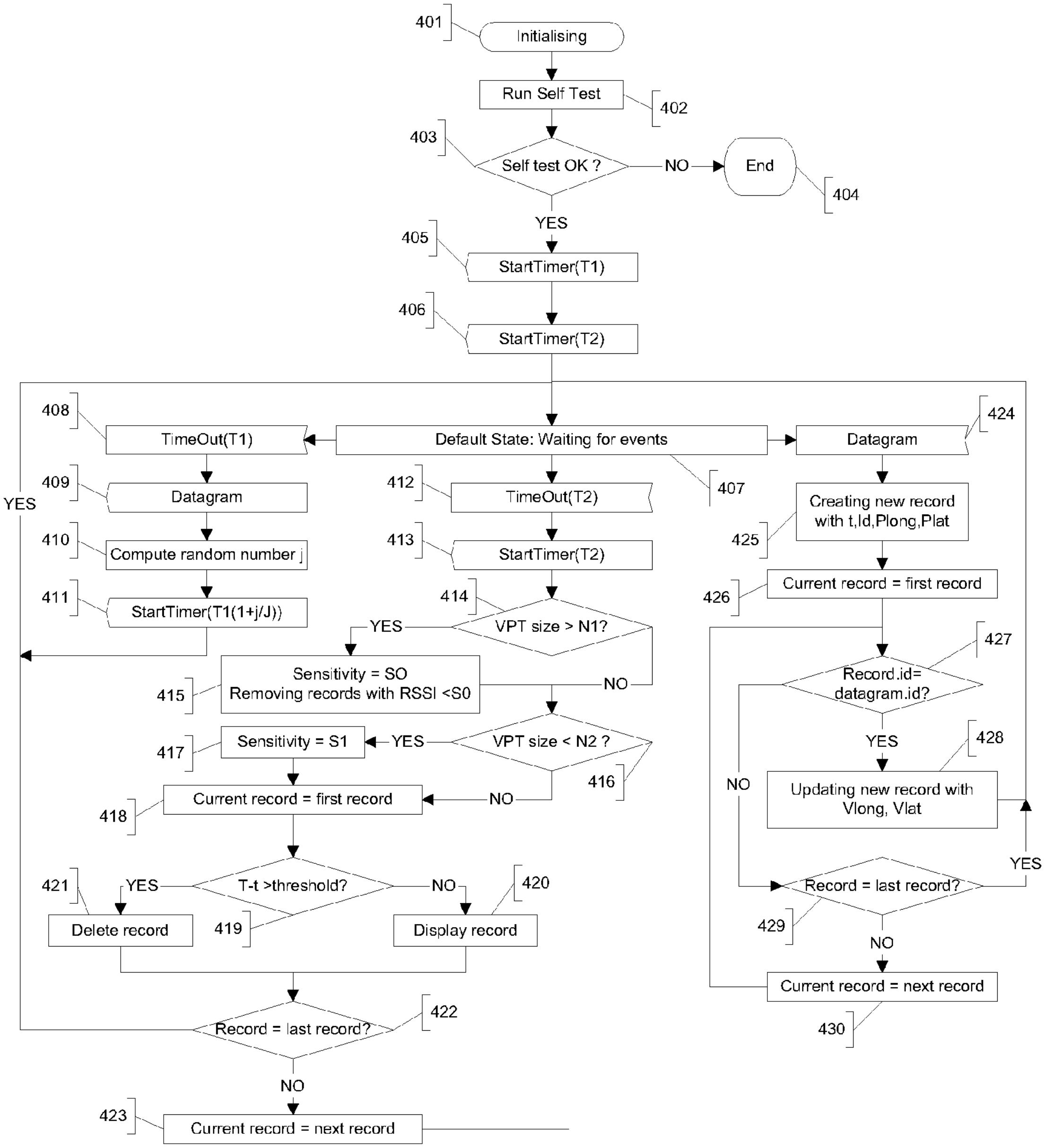
FIG. 4 is a flow chart depicting an illustrative method according to the present invention.

The method executed by the TM 100 according to the present invention is illustrated in FIG. 4.

At 401, the method starts by executing its initialization, typically when the TM 100 is powered on. At 402, a self test is performed to check that the operating environment will allow proper execution of the method. At 403, if the self test is successful, the process continues. If the self test is not successful the process ends at 404.

At 405, a first timer is started with an initial value equal to T1. When the time T1 is elapsed, a time out message is generated by the first timer. At 406, a second timer is started with an initial value of T2. When the time T2 is elapsed, a time out message is generated by this second timer.

At 407, the method enters into a waiting state, expecting events to occur. If the event is the reception of a "TimeOut (T1)" from the first timer, then control is given to 408. If the event is the reception of a "TimeOut(T2)" from the second timer, then control is given to 412. If the event is the reception of a message from another vehicle, then control is given to 424.

Reception of a "TimeOut(T1)"—Broadcast of Messages

In an embodiment, the broadcast of the message 200 (FIG. 2) is not repeated exactly every T1 seconds. The WC 101 of the TM 100 broadcasts a message 200 to other vehicles every T1 seconds plus or minus a random number to avoid collisions. The time interval between two transmissions is equal to T1 (1+j/J) where j is a random number varying between 0 and 1, and where J is a fixed number.

At 408, a "TimeOut(T1)" primitive is received, signaling that the timer started either at 405 or at 411 has elapsed. At 409, the emitter part WC 101 of the TM 100 broadcasts a message to other vehicles. This message comprises: the vehicle "id" 201; information corresponding to the current Longitude 202 "Plong" of the vehicle provided by the positioning system 104 through the PSI component 103; and information corresponding to the current Latitude 203 "Plat" of the vehicle provided by the positioning system 104 through the PSI component 103.

At 410, a random number j varying between 0 and 1 is computed. At 411, the first timer is started again with an initial time value equal to T1 (1+j/J) and the process the process returns to 407 waiting for the occurrence of an event.

Reception of a "TimeOut(T2)"—Information Cleaning

At 412, a "TimeOut(T2)" primitive is received, signaling that the timer started either at 406 or at 413 has elapsed. At 413, the second timer is started again for a time period of T2 (the background process is executed every T2 seconds).

At 414, the number of records 310 within the VPT 300 (FIG. 3) is compared with a given threshold N1. At 415, if the number of records 310 within the VPT 300 exceeds the threshold N1, then the sensitivity of the receiver part of the WC 101 is set to a lower value S0 to limit the range of the receiver, and to decrease the number of reachable vehicles.

At 416, the number of records 310 within the VPT 300 is compared with a threshold N2 (with N2<N1). At 417, if the number of records 310 within the VPT 300 is below the threshold N2 (with N2<N1), then the sensitivity of the receiver part of the WC 101 is set back to a higher value S1 (S1>S0) to restore the normal range of the receiver, and to increase the number of reachable vehicles.

At 418, the process begins with the current record in the VPT 300. At 419, a test is performed to check whether or nor the difference between the current time "T" and the value of the "t" field 311 of the current record is higher than a fixed threshold. If it is the case, then the record is considered as being too old (obsolete) and control is given to 421; otherwise control is given to 420.

At 420, if the difference between "T" and "t" doesn't exceed a predefined threshold, then the corresponding record 310 is displayed to the user on the screen 109 by directing the UIC component 108 to draw an arrow starting at coordinates (Plong, Plat), and ending at coordinates (Plong+Vlong, Plat+Vlat). Then control is given to 422.

At 421, if the difference between "T" and "t" exceeds a predefined threshold, then the corresponding record 310 is deleted from the VPT 300.

At 422, a test is performed to check if the current record is the last record of the VPT table 300. If it is the case, then control is given to 407; otherwise control is given to 423.

At 423, if the current record is not the last record, the process goes on with the next record in the VPT 300 which becomes the new current record at 419. if the current record is the last record, the process returns to 407 waiting for the occurrence of an event.

Reception of a Message

At 424, a message 200 from another vehicle is detected by the receiving part of the TM 100. At 425, upon reception of this new message 200, a new record is created in the VPT 300, wherein the "t" field is set equal to the current time (in an alternate embodiment the "t" field is set equal to the time retrieved from the received message), and the fields 312 "Id", 313 "Plong", and 314 "Plat" are filled with the values of fields 201, 202, and 203 of the received message 200.

At 426, the process begins with the current record in the PVT 300. The current record is the first record to be processed. The VPT 300 is scanned to find another record sharing the same "Id" field 312 (originated from the same vehicle).

At 427, the "Id" field 312 of the new record is compared with the "id" field of the current record. At 428, if the new record and the current record in the VPT 300 share the same "Id" field 312, the new record 310 is updated by filling the fields 315 "Vlong" and 316 "Vlat" with the computed speed, along the longitude and the latitude coordinates, derived from the two successive positions of the vehicle. In an embodiment, if the speed is found below a predefined threshold, then an alert is raised or a sound is emitted on the speaker 110 to alert the user of a potential danger (e.g., traffic jam). The current record is deleted from the VPT 300.

At 429, a test is performed to check if the current record is the last record of the VPT table 300. If it is the case, then control is given to 407; otherwise control is given to 430. At 430, if the current record is not the last record, the record following the current record becomes the new current record, and control is returned back to 427. if the current record is the last record, the process returns to 407 waiting for the occurrence of an event.

Traffic Estimation

In the embodiment previously described, the traffic conditions are estimated based on two successive messages from the same vehicle. The calculated information (location, speed, direction) related to each vehicle is juxtaposed on a map and represented on a display in order to visualize the traffic. Only current records are stored and previous records are deleted from the VPT 300.

In another embodiment it is possible to keep previous records in order to show the evolution of the traffic over the time and in particular to detect places (e.g., streets, roads, highways, area, etc.) where the traffic is improving or degrading.

In another embodiment, the previous records can also be used to smooth the results over a given period of time, for instance by calculating for each vehicle an average speed and direction based on more than two successive messages.

In an alternate embodiment it is also possible to aggregate and correlate the information related to vehicles located in a particular geographical zone in order to obtain a global view of this traffic in this geographic zone (e.g., street, road, highway, area, etc.). For instance, an average speed can calculated for all the vehicles running in a same direction in a particular portion of a street. The traffic can be estimated based on both the average speed in a specific direction and on the number of vehicles in a particular geographic zone (the traffic is generally more dense in congested areas).

Route Determination

Navigation information can be generated based on estimated traffic conditions. In particular it is possible to calculate routes based on the average speed of the vehicles in a specific area. The possible routes can be ordered and selected depending on the necessary estimated time to go from the current position of the vehicle to a given destination.

Traffic Representation

Figure 5:
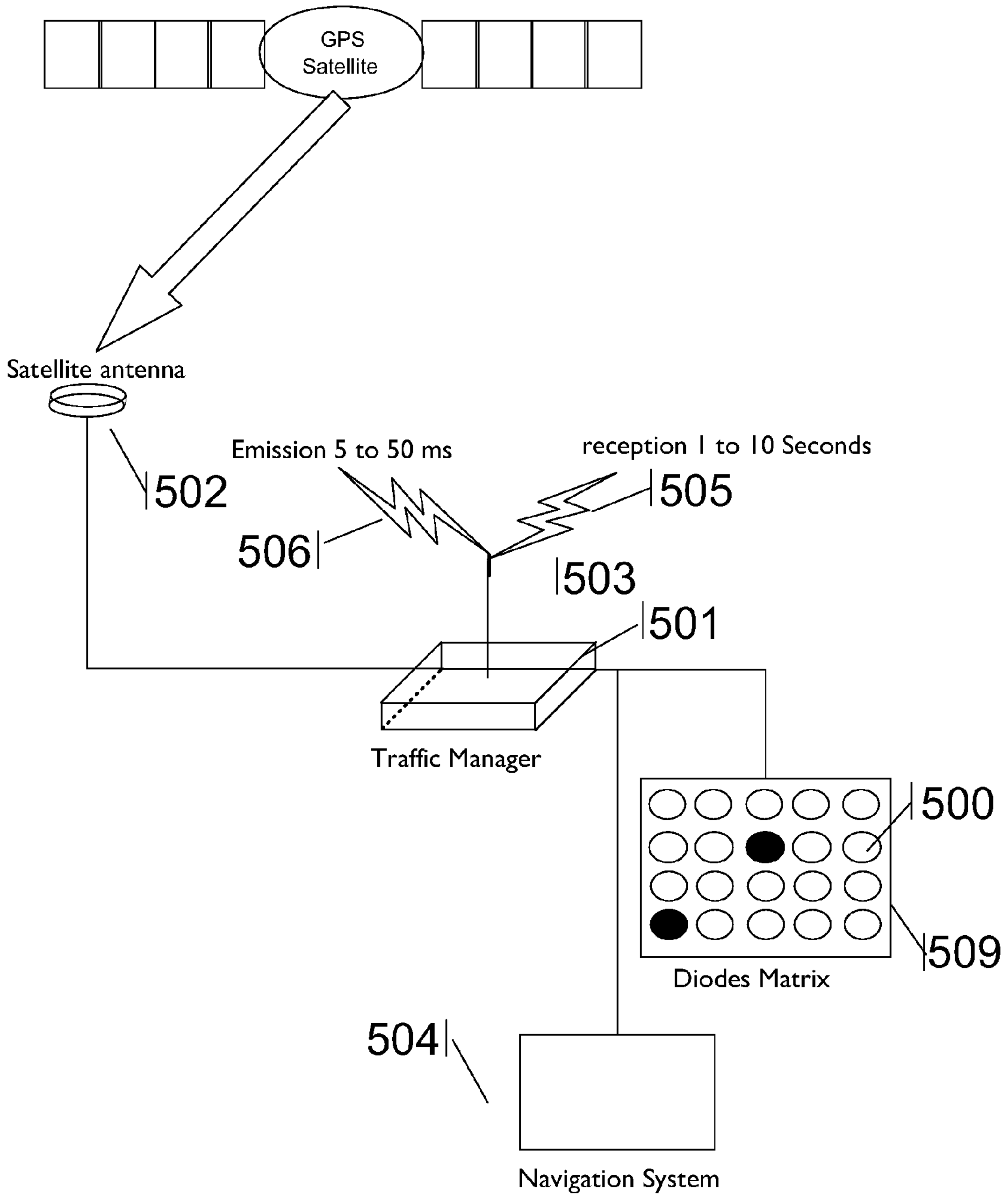
FIG. 5 represents a display including LEDs for representing the traffic according to an embodiment of the present invention.

FIG. 5 shows an embodiment of the present invention including a LED display to represent the traffic. As previously described, a Traffic Manager (TM) 501 is connected to an antenna 502 to receive the GPS signal and to another antenna 503 to receive and transmit position and identification information. The TM 501 can include or can be connected to a display consisting of a matrix 509 of Light-Emitting Diodes (LEDs). Each LED 500 corresponds to an area around a point at a given longitude and latitude. The upper part of the screen gives the current direction of the vehicle. A car navigation system 504 can also be connected to the TM 501 in order to calculate routes according to the traffic. The receiver part of the TM 501 collects position information 505 of all surrounding vehicles (preferably during a cycle of 1 to 10 seconds). After this first cycle and the broadcast of its own position and identification 506 (e.g., during 5 to 50 ms), the TM 501 collects the position of all surrounding vehicle for a second time. It is possible now for the TM 501 to calculate the displacement of each vehicle. The calculator is able to draw a map with the position of moving vehicles and to correlate this movement, for instance, with traffic lights, etc.

Figure 6:
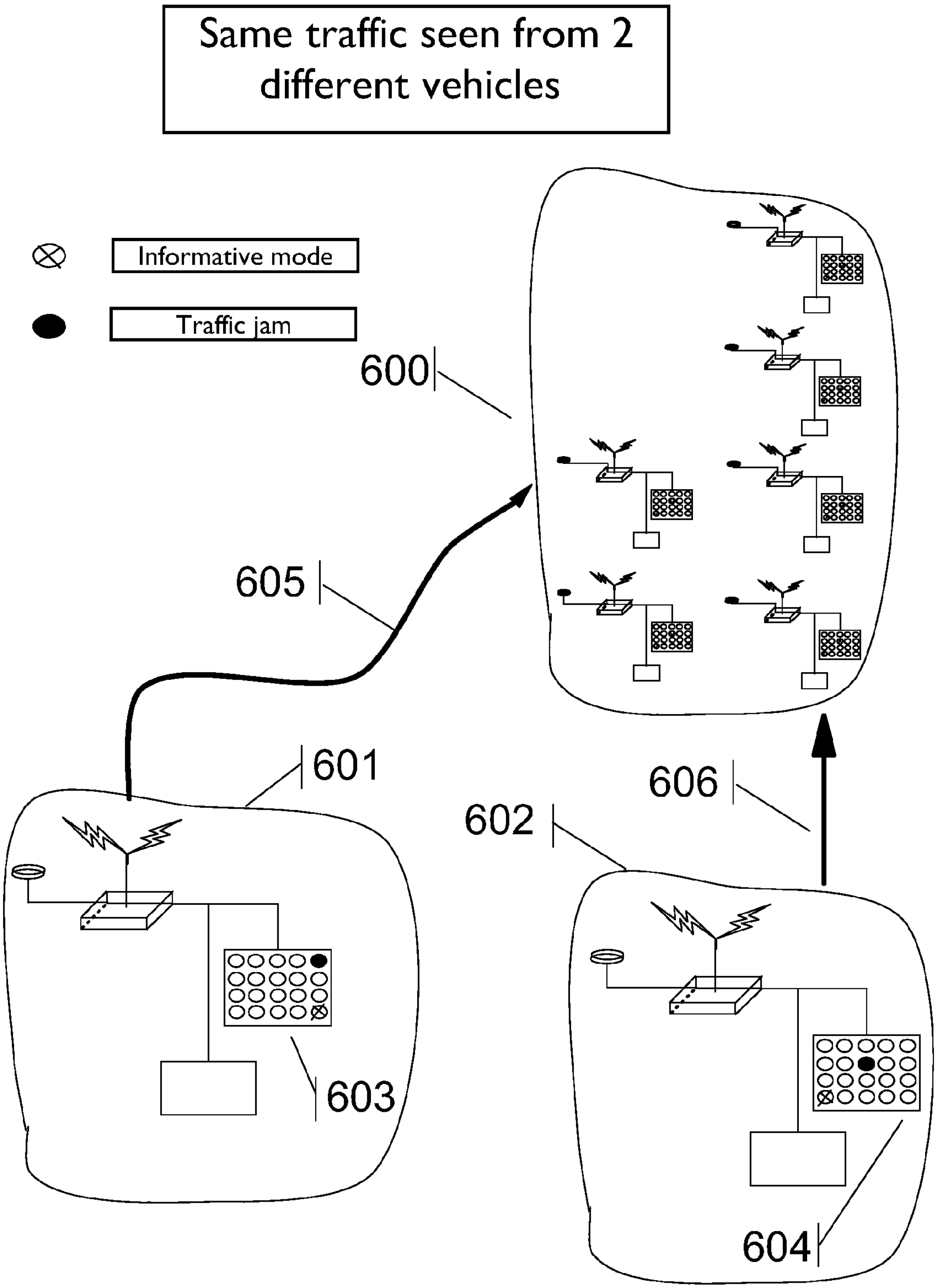
FIG. 6 shows how the traffic is represented for two different cars according to an embodiment of the present invention.

As illustrated in FIG. 6, when using a LED display, the way the traffic is represented depends on the position and the direction of the vehicle. Let us consider two cars. Car 601 follows a first trajectory 605 and car 602 follows a second trajectory 606. The same information is received by both the first car 601 and the second car 602. However, the view of the traffic on the LED display of each of the cars (respectively display 603 for car 601, and display 604 for car 602) is different because this view depends on their respective position with respect to the vehicles constituting the traffic 600. The traffic is represented by LEDs 500 of different colors. In the present example the color black indicates the position of stopped cars (traffic jam) in a specific area. A cross indicates the relative position of moving cars. In the reality red and green LEDs can be used. In the present example, the cars 601 and 602 are running on parallel roads. The cars 600 are stopped.

The LED display of car 601 shows a red light on the upper right corner indicating a traffic jam on the parallel road. A green light on the bottom right corner indicates that another vehicle is running on his right side. The car 601 driver can turn right in the traffic jam. However, he can also decide to go straight since there is no vehicle in this direction. The LED display of car 602 clearly shows cars stopped in front of it. The green LED in the bottom left corner shows car 601 running on his left side.

Using the same TM, more sophisticated information can be displayed on a car navigation system and superposed on a GPS road map, for instance. The traffic can be represented on a map showing the roads, streets, highways, traffic lights, crossroads, etc. Cartographic information and speed information can be associated for instance by coloring streets/roads (e.g., green, or amber, or red) according to the speed and direction of the vehicles.

Considering the high resolution displays commonly used with modern navigation systems, it is possible to represent all cars and to include speed indications (e.g., cars stopped, running slowly, waiting for x minutes, etc.). The car navigation system can also propose alternate routes.

In an embodiment, the successive traffic conditions can be memorized in order to have a view of the traffic evolution over the time. With this arrangement, it is possible to see whether the traffic is degrading or is upgrading, where and in which proportion.

A TM 100 can be installed on a fixed point, in a vicinity of a traffic road, to collect traffic information from moving vehicles. This can be used to feed traffic aggregation information systems. However, these systems are beyond the scope of the current invention. They can be used to control a green light for instance. Police forces may use the received messages to identify excessive speeds, or to perform the localization of a searched vehicle.

While the invention has been shown and described with reference to at least one embodiment, it will be understood that various changes in form and detail may be made therein without departing from the spirit, and scope of the invention.

What is claimed is:

1. A method for estimating a current traffic condition based on positioning information exchanged between vehicles using wireless communication, the method comprising:

receiving, using a wireless communication system, positioning information repeatedly broadcast by a plurality of vehicles, the positioning information for each vehicle comprising:

information related to a current location of the vehicle; and information identifying the vehicle;

storing, using a cartographic information repository, the positioning information for each vehicle;

calculating, using a micro-controller, based on at least two successive locations of the same identified vehicle, a current speed and a current direction for the same identified vehicle;

estimating, using the micro-controller, the current traffic condition based on the current location, the current speed and the direction of each identified vehicle; and adjusting a sensitivity for the receiving when a quantity of the plurality of vehicles exceeds a threshold.

2. The method according to claim 1, further comprising, for each vehicle:

repeatedly determining the current location of the vehicle; and broadcasting to other vehicles the positioning information comprising:

the information related to the determined current location; and the identifying information.

3. The method according to claim 1, wherein the information related to the current location of the vehicle further comprises:

a current latitude of the vehicle; and a current longitude of the vehicle.

4. The method according to claim 1, wherein the position information broadcast to other vehicles comprises a time associated with the current location of the vehicle.

5. The method according to claim 1, wherein receiving positioning information repeatedly broadcast by other vehicles, further comprises:

associating a respective current time with each received positioning information.

6. The method according to claim 1, wherein the calculating further comprises, for each received positioning information:

identifying at least one previously recorded positioning information for the same identified vehicle;

calculating the current speed and the current direction of each identified vehicle based on the current location and at least one previous location of each identified vehicle; and recording the current positioning information with the current speed and current direction of each identified vehicle.

7. The method according to claim 1, wherein estimating the current traffic condition further comprises:

representing each identified vehicle on a geographical map with an indication of its respective speed and direction.

8. The method according to claim 1, wherein estimating the current traffic condition further comprises:

aggregating the positioning information of the identified vehicles within geographical zones; and representing the aggregated positioning information on a map.

9. The method according to claim 1, wherein estimating current traffic information further comprises:

generating navigation information based on the estimated current traffic condition.

10. The method according to claim 1, wherein estimating the current traffic condition further comprises:

alerting a driver of an occurrence of predefined abnormal traffic conditions.

11. The method according to claim 1, wherein estimating the current traffic condition further comprises:

recording successive traffic conditions to determine an evolution of the traffic conditions over time.

12. A system for use in a vehicle for estimating a current traffic condition based on a positioning information exchanged between vehicles using wireless communication, comprising:

at least one traffic manager device including:

a system for receiving the positioning information repeatedly broadcast by a plurality of vehicles, the positioning information for each vehicle comprising:

the information related to the current location of the vehicle; and the information identifying the vehicle;

a system for storing the positioning information for each vehicle;

a system for calculating based on at least two successive locations of the same identified vehicle, a current speed and a current direction for the same identified vehicle;

a system for estimating the current traffic condition based on the current location, the current speed and the direction of each identified vehicle; and a system for adjusting a sensitivity for the receiving system when a quantity of the plurality of vehicles exceeds a threshold.

13. The system according to claim 12, further comprising, for each vehicle:

a system for repeatedly determining the current location of the vehicle; and a system for broadcasting to other vehicles the positioning information comprising:

information related to the determined current location; and the identifying information.

14. The system according to claim 12, wherein the information related to the current location of the vehicle further comprises:

a current latitude of the vehicle; and a current longitude of the vehicle.

15. The system according to claim 12, wherein the position information broadcast to other vehicles comprises a time associated with the current location of the vehicle.

16. The system according to claim 12, wherein the system for receiving positioning information repeatedly broadcast by other vehicles further comprises:

a system for associating a respective current time with each received positioning information.

17. The system according to claim 12, wherein the system for calculating is configured, for each received positioning information, to:

identify at least one previously recorded positioning information for the same identified vehicle;

calculate the current speed and the current direction of each identified vehicle based on the current location and at least one previous location of the each identified vehicle; and record the current positioning information with the current speed and current direction of each identified vehicle.

18. The system according to claim 12, wherein the system for estimating the current traffic condition further comprises:

a system for representing each identified vehicle on a geographical map with an indication of its respective speed and direction.

19. The system according to claim 12, wherein the system for estimating the current traffic condition further comprises:

a system for aggregating the positioning information of the identified vehicles within geographical zones; and a system for representing the aggregated positioning information on a map.

20. The system according to claim 12, wherein the system for estimating current traffic information further comprises:

a system for generating navigation information based on the estimated current traffic condition.

21. The system according to claim 12, wherein the system for estimating the current traffic condition further comprises:

a system for alerting a driver of an occurrence of predefined abnormal traffic conditions.

22. The system according to claim 12, wherein the system for estimating the current traffic condition further comprises:

a system for recording successive traffic conditions to determine an evolution of the traffic conditions over time.

23. A program product stored on a non-transitory computer readable medium, which when executed, estimates a current traffic condition based on a positioning information exchanged between vehicles using wireless communication, the computer readable medium comprising program code for:

receiving, using a receiving device, positioning information repeatedly broadcast by a plurality of vehicles, the positioning information for each vehicle comprising:

information related to a current location of the vehicle; and information identifying the vehicle;

storing the positioning information for each vehicle;

calculating, using a computing device, based on at least two successive locations of the same identified vehicle, a current speed and a current direction for the same identified vehicle;

estimating, using the computing device, the current traffic condition based on the current location, the current speed and the direction of each identified vehicle; and adjusting a sensitivity for the receiving when a quantity of the plurality of vehicles exceeds a threshold.

* * * * *